US006985883B1

(12) United States Patent
Togher et al.

(10) Patent No.: US 6,985,883 B1
(45) Date of Patent: Jan. 10, 2006

(54) CREDIT MANAGEMENT FOR ELECTRONIC BROKERAGE SYSTEM

(75) Inventors: Michael Togher, New York City, NY (US); Michael F. Dunne, Boonton, NJ (US); Richard Hartheimer, Morris Plains, NJ (US)

(73) Assignee: EBS Dealing Resources, Inc., New York, NY (US)

( * ) Notice: Subject to any disclaimer, the term of this patent is extended or adjusted under 35 U.S.C. 154(b) by 0 days.

(21) Appl. No.: 09/563,461

(22) Filed: May 2, 2000

Related U.S. Application Data

(63) Continuation of application No. 09/169,884, filed on Oct. 12, 1998, now abandoned, which is a continuation of application No. 08/665,594, filed on Jun. 18, 1996, now Pat. No. 6,014,627, which is a continuation of application No. 08/324,843, filed on Oct. 18, 1994, now abandoned, which is a continuation of application No. 07/830,408, filed on Feb. 3, 1992, now Pat. No. 5,375,055.

(51) Int. Cl.
*G06F 17/60* (2006.01)

(52) U.S. Cl. .............................. 705/37; 705/1; 705/35; 705/38

(58) Field of Classification Search ............ 705/35–38, 705/1
See application file for complete search history.

(56) References Cited

U.S. PATENT DOCUMENTS

| | | | |
|---|---|---|---|
| 3,573,747 A | 4/1971 | Adams et al. | |
| 4,412,287 A * | 10/1983 | Braddock, III | 705/37 |
| 4,674,044 A | 6/1987 | Kalmus et al. | 364/408 |
| 4,903,201 A | 2/1990 | Wagner | 364/408 |
| 4,942,616 A * | 7/1990 | Linstroth et al. | 704/275 |
| 4,980,826 A * | 12/1990 | Wagner | 705/37 |
| 5,038,284 A * | 8/1991 | Kramer | 705/37 |
| 5,136,501 A | 8/1992 | Silverman et al. | 364/408 |
| 5,243,331 A | 9/1993 | McCausland et al. | |
| 5,267,148 A | 11/1993 | Kosaka et al. | 364/408 |
| 5,297,032 A * | 3/1994 | Trojan et al. | 705/37 |
| 5,375,055 A | 12/1994 | Togher et al. | 705/37 |
| 5,915,245 A | 6/1999 | Patterson, Jr. et al. | 705/35 |

(Continued)

FOREIGN PATENT DOCUMENTS

EP      0411748      5/1990

(Continued)

OTHER PUBLICATIONS

Herman, Tom; "The Next Voice These Traders Hear My Be a Computer—EJV Brokerage's New System of Sound Recognition Matches Buy, Sell Orders"; May 29, 1991; The Wall Street Journal; pp. 1-2.*

(Continued)

*Primary Examiner*—Ella Colbert
(74) *Attorney, Agent, or Firm*—Dickstein, Shapiro, Morin & Oshinsky, LLP.

(57) ABSTRACT

An anonymous trading system (FIG. 1) identifies the best bids and offers (QuoteSubmit, FIG. 3) from those counterparties (WS A1a1) with which each party (WS A1fb1, WS A1b2, ... WS A2a2) is currently eligible to deal, while maintaining the anonymity of the potential counterparty and the confidentiality of any specific credit limitations imposed by the anonymous potential counterparty. To that end, each bid or offer (QuoteSubmit, FIG. 3) for a particular type of financial instrument is prescreened by the system for compatibility with limited credit information (for example, a one bit flag indicating whether a predetermined limit has already been exceeded) and an anonymous "Dealable" price (24,26) is calculated for each of the traders (WS A1b, ... WS A2a) dealing with that particular financial instrument.

45 Claims, 6 Drawing Sheets

U.S. PATENT DOCUMENTS

| | | | |
|---|---|---|---|
| 5,918,218 A | 6/1999 | Harris et al. | 705/37 |
| 5,924,082 A | 7/1999 | Silverman et al. | 705/37 |
| 5,963,923 A | 10/1999 | Garber | 705/37 |
| 6,014,627 A | 1/2000 | Togher et al. | 705/1 |

FOREIGN PATENT DOCUMENTS

| | | |
|---|---|---|
| EP | 0407026 | 1/1991 |
| GB | 2258061 * | 1/1993 |

OTHER PUBLICATIONS

Newman, Anne; "Nasdaq Readies Link to Global, Predawn Trading"; Jan. 14, 1992; Asian Wall Street Journal; pp. 1-3.*
Declaration of William Lloyd Donner (discussing the Money Match Functional Specification).
Money Match, Functional Specification, Version 1, Aug. 1990, The Sequor Group Inc. Software Service.
Trading Systems Technology, "Radar Emerges as Rival To Reuters'Dealing 2000-2", vol. 3, No. 8, Oct. 23, 1989.
Earle, Dennis M., New Path for Trade Settlement, Wall Street Computer Review.
Schmerken, Ivy Banks Eye Forex Matching Systems, Wall Street Computer Review, vol. 9, No. 2, p. 45.
Campbell, Carl M. Jr., A Microprocessor-Based Module to Provide Security in Electronic Funds Transfer System, IEEE Compcon, Fall of 1979.
Wilson, John F., On-Line International Cash Management, Annual ACM Conference, 1983.
Burman, Michael, Aspects of a High-Volume Production Online Banking System, IEEE Compcon, Spring of 1985.
Weintraub, B.A., Managing Change in a High Dollar Electronic Funds Transfer Environment, IEEE Compcon, Springer of 1987.
Sammer, Harald W., Online Stock Trading Systems: Study of an Application, IEEE Compcon, Spring of 1987.
Malone, Thomas W., Yates , Joanne, Benjamin, Robert I., Electronic Markets and Electronic Hierarchies, Communications of ACM, Jun. 1987.
Clemons, E.K., Row, C. Merrill Lynch Cash Mgmt Account Financial Svc: A Case Study in Strategic Info Systems, 21st Annual Hawaii Int. Conf. on Sysm. Sci. 1988, V. 4.
Finebaum, M., Information Systems in the Securities Industry, 21st Annual Hawaii Int. Conf. on Sysm. Sci. 1988, vol. 4.
Sager, M.T., Competitive Alliances with Info, Tech., The Australian Retail Banking Experience, 22nd Annual Hawaii Int. Conference on System Sciences, 1989, vol. 4.
Gutner, Tammi, Fine If You're Big, The Banker, Oct. 1988.
Arend, Mark, Swift Speeds up as Broker/Dealers Join, Wall Street Computer Review, Jan. 1989.
Essinger, James, ISE's "SAEF" Debuts to Make the Market Sound, Wall Street Computer Review, May 1989.
Freund, W.C., Electronic Trading and Linkages in Intn'l Equity Markets, Financial Analysis Journal, May-Jun. 1989.
Schmerken, Ivy, High-Tech Banks Set to Challenge Wall Street, Wall Street Computer Review, Jul. 1989.
Arend, Mark, Banks Lure Investors with High-Tech Convenience, Wall Street Computer Review, Dec., 1989.
Arend, Mark, Where Wall Street's Tending in Trading Systems Design, Wall Street Computer Review, Jun. 1990.
Brennan, P.J., OTC Trading Systems Lead in Race to Automate, Wall Street Computer Review, Nov. 1990.
Cody, B.J., Reducing the Costs and Risks of Trading Foreign Exchange, Wall Street Computer Review, Nov. 1990.
Arend, Mark, Seer Technologies Still Learning to Fly, Wall Street Computer Review, Jun. 1991.
Goodman, Ann, The MONEP: Mixing Men and Machines for Market Might, Wall Street Computer Review, Aug. 1991.
Heymann, D.P., A Performance Model of the Credit Manager Algorithm, Computer Networks and ISDN Systems, Mar. 1992.
Richaczek, Karl, Teletrust, Computer Networks and ISDN Systems, 1987.
Hansell, Saul, The Wild, Wired World of Electronic Exchanges, Institutional Investor, Sep. 1989.
Turoff, Murray, Chinai, Jenjit, An Electronic Information Marketplace Computer Networks and ISDN Systems, 1985.
Tulley, C., International Banking and Communication, Networks and Electronics Office Systems, 1985.
Method for Collection of Accounting Data, IBM Technical Disclosure Bulletin, 1986.
Banks Look to Build FX Order—Matching System Quotron Eyed as Vendor, Minex as Co-Sponsor?, FX Week, May 17, 1991.
TST Interviews Evan Schulman, Automated Trading Poineer, Trading Systems Technology, Jul. 15, 1991.
Special Report: Citibank Mulls Strategy to Gain Control of Trading Systems, Trading Systems Technology, Oct. 7, 1991.
Staying in the Middle: . . . Brokers are Fighting to Keep Their Role in the Market; Includes Related Article on Crossing Networks, Wall Street Comp. Rvw., Dec. 1991.
Technology: ABN-AMRO Signs on Dotted Line as the Twelfth EBS Member, FX Week, Dec. 14, 1992.
Davis, Stephen G., Two Rivals to Reuters'F/X System April Launches, Bank Letters, Nov. 30, 1992.
Two Rivals to Reuters'F/X System April Launches, Bank Letter, Nov. 30, 1992.
Reuters to Offer Last-Trader Feed of Currency Rates, Inside Market Data, Jun. 8, 1992.
Jeffries, AZX, Others Team with Buy-Side Software System, Wall Street Letter, Jun. 8, 1992.
Clean Air Futures; Chicago Board of Trade's Proposed Emissions Credit Trading Program, Sulphur, May 1992.
Proprietary Execution: Minex Secures Asian Support for Order-Matching System, Trading System, Trading Systems Technology, Jan. 27, 1992.
Goodman, Ann, New Trading Products Spawn New Systems: The Chicago Board of Trade is Building a New Electronic Trading System, Wall Street Comp. Rvw. Jan. 1992.
Proprietary Execution: Quotron, EBS Demo Prototype of Forex Order-Matching System, Trading Systems Technology, Nov. 4, 1992.
Eleven Banks, Quotron Unveil EBS Demo Anonymous Forex Order-Matching System, FX Week, Nov. 1, 1991.
Keith, C., The Overdue Revolution: Equity Trading in the Post-Electronic Age: A Working Plan for a Customer-Based System, Invstmt Dealer's Digest, Sep. 30, 1991.
AVCO Financial Corp.: Recurrence Software for the Serious Trader: Recurrence Real-Time Currency Trading System, Mag. of Communication. Options, Sep. 15, 1991.
Banks Ready to Give up on Reuters, Top of the Week; p. 16, Jun. 10, 1991.
Fingleton, Eamonn, Tokyo Takes on Reuters in the Race to Wire the Forex World, Internation Japan Journal; p. 35, Dec. 1990.
Arend, M., New Systems Lighten Load on Bank Securities Wings . . . , Wall Street Computer Review, Nov. 1990.

Republic National Bank of New York Selects Remos-FX, Newswire Assoc., Inc. Sep. 12, 1989.

Debow, Y., Foreign Banks Equip for Battle in the U.S.; Includes Related Article on The Union Bank of Switzerland's Private Network Expansion, Dealer's Digest 1989.

Schmerken, Ivy, What's Next on Wall Street's Automation Agenda? Trading Technology, Wall Street Computer, Review, Apr. 1989.

VAX-11 Version of "IBIS" Released by Tymshare, Computer World May 9, 1983.

Proposed Rulemaking, Proprietary Trading Systems Securities and Exchange Commission, Apr. 11, 1989.

Letter from Robert A. McTamancey, Esq., Re: RMJ Securities Jan. 12, 1989.

Letter from Robert A. McTamaney.

Letter from Patteson Branch, Re: Exchange Services, Inc., Sep. 11, 1991.

Letter from Patteson Branch, Jun. 5, 1991.

Letter from Charles R. Hood, Esq., Re: Instinet Corporation Crossing Network, Jul. 1, 1992.

Letter from Lloyd H. Feller, Esq., Re: The Lattice Network, Sep. 9, 1993.

Letter from M. Pierre Flueriot, Re: Distributions of Certain French Securities, Jun. 7, 1994.

Securities and Exchange Commission, Action: Policy Statement, Nov. 16, 1989.

Ivy Schmerken, The Electronic Broker that Could, Wall Street Computer Review, vol. 8, No. 12, p. 42.

* cited by examiner

Fig. 4

```
                                        70
Dealable Price Display (select one)    80—Regular Priority—    Best Dealable—
Currency Trading Pair                    xxx/xxx—72                    82
Normal Trade Size                        nnn—74
Maximum Trade Size                       nnn—76
Price Time Limit                         min. ___ sec. ___ NTL y/n—78
Work the Balance based on (select one) 82—Complete+Partial_  Partial_  None_
Cancel When Bettered                     y/n—78
Display EBS Best                         y/n
Display EBS Deals                        y/n
Display EBS Currencies                   y/n
EBS Currencies                           xxx/xxx  xxx/xxx  xxx/xxx  xxx/xxx
                                         xxx/xxx  xxx/xxx  xxx/xxx  xxx/xxx
                                         xxx/xxx  xxx/xxx  xxx/xxx  xxx/xxx
```

| FROM \ TO | TFA1 | TFA2 | TFB1 | TFB2 |
|---|---|---|---|---|
| TFA1 | 0 | 1 | 0 | 1 |
| TFA2 | 1 | 1 | 0 | 1 |
| TFB1 | 0 | 1 | ///  | /// |
| TFB2 | 1 | 0 | /// | /// |

Fig. 6

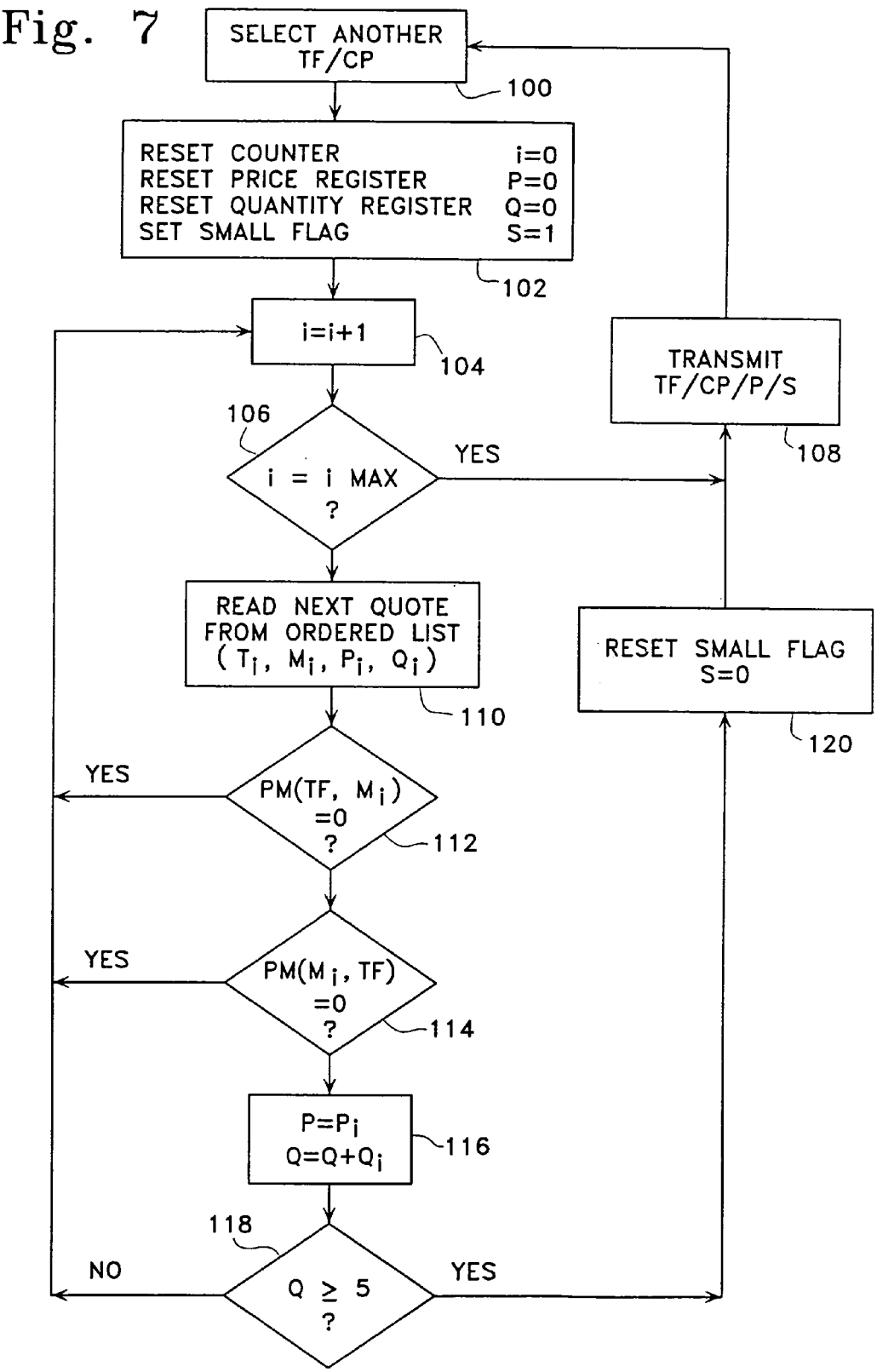

CREDIT MANAGEMENT FOR ELECTRONIC BROKERAGE SYSTEM

CROSS REFERENCE TO RELATED APPLICATIONS

This is a continuation of application Ser. No. 09/169,884, filed Oct. 12, 1998 now abandoned, which is a continuation of prior application Ser. No. 08/665,594, filed Jun. 18, 1996 (now U.S. Pat. No. 6,014,627), which is a continuation of prior application Ser. No. 08/324,843, filed Oct. 18, 1994 (now abandoned), which is a continuation of prior application Ser. No. 07/830,408, filed Feb. 3, 1992 (now U.S. Pat. No. 5,375,055).

TECHNICAL FIELD

The present invention relates generally to a electronic brokerage system having a communication network connecting traders dealing in financial instruments, and more particularly to a computerized system for distributing anonymous price quotes on a selective basis in accordance with previously established credit limits.

BACKGROUND ART

Reuters' published European patent applications EP 399 850, EP 407 026, and EP 411 748 disclose an automated matching system for anonymous trading of foreign currencies (or other financial instruments) in which a single host computer maintains a central data base consisting of all the trading instruments available for trade, credit information, and the various bids and offers that are present throughout the system. The host computer uses the information in its central data base to match active bids and offers (as well as executing any transitory "hit bid" and "take offer" transactions) based on matching criteria which include the gross counterparty credit limit between counterparties to a potential matching transaction, price, and available quantity. To that end, each client site establishes and may subsequently vary or reset a credit limit for each possible counterparty, which is used by the host computer to establish the gross counterparty credit limit for each possible pair of parties and which is equal to the minimum of the remaining credit (initial credit limit less any applicable transactions that have already been executed) from the first party to the second party and from the second party to the first party. The host computer blocks completion of an otherwise eligible matching transaction between a given pair of potential counterparties when the transaction has an associated value in excess of the applicable gross credit limit. In that system, the various client site computers (keystations) merely maintain and display a restricted subset of the information available at the central computer, such as a predetermined number of the best bids and offers, and communicate credit and other transaction oriented information to the host computer for execution. However, in an attempt to preserve the anonymity of the parties, the client sites do not have access to any credit limits set by their possible counterparties, or even to the identification of any other party to a particular transaction until after a transaction has been completed.

Thus, in the known prior art system, confidential counterparty credit limit data is maintained in real time and utilized as part of the trade matching process by a central host computer. As a consequence, each client site has no way to determine, prior to committing to buy or sell at a displayed price from one or more anonymous counterparties, whether it is in fact eligible to respond to any of the bids or offers currently being displayed. The client site is connected to the central host computer by telecommunication lines; the host computer is not under the direct control of the party providing the confidential credit limit data and thus provides potential opportunities for unauthorized access to the credit information, even though the host computer does not utilize the credit information until a match has been found between a Buyer and a Seller.

Consequently, unless he attempts to execute a trade at the best price currently displayed on his screen, a trader using the prior art anonymous matching system has no way of knowing whether he has credit with, and is willing to extend credit to, the anonymous counterparty offering (bidding) the best price currently displayed on his screen and thus whether any attempt to buy or sell at the displayed price will be subsequently invalidated by the system for lack of such credit.

SUMMARY OF THE INVENTION

It is an overall objective of the present invention to provide an anonymous trading system which can identify the best bids and offers from those counterparties with which each client site is currently eligible to deal, while maintaining the anonymity of the potential counterparty and the confidentiality of any specific credit limitations imposed by the anonymous potential counterparty.

To that end, each client site preferably provides the system with only limited credit information for each potential counterparty (for example, a one bit flag indicating whether a predetermined limit has already been exceeded) and each bid or offer for a particular type of financial instrument is preferably prescreened by the system for compatibility with that limited credit information before calculating an anonymous "Dealable" price for presentation to any of the traders dealing with that particular financial instrument.

In a presently preferred embodiment, the prescreening is a simple check to determine whether any credit remains between the two possible counterparties to the potential transaction, and thus may be performed using a simple yes/no Preauthorization Matrix before any bid or offer is transmitted to a particular client site.

In accordance with a preferred embodiment, such Preauthorization Matrices are maintained at each of several regional nodes ("distribution nodes") of a distributed processing communication network, with each such distribution node being connected by corresponding individual permanent links of the network to those client sites ("access nodes") for which it is responsible for distributing market information including customized "Dealable" bid and offer prices in addition to global "Best" prices.

More particularly, in the preferred embodiment, the sensitive credit limit data indicating how much credit a particular client site is willing to extend to each possible counterparty is maintained only at an access node associated only with that particular client, and only a simple yes/no indication of whether the entity (for example, a trader, a Trading Floor, or a bank) associated with that particular access node is willing to transact business with a particular counterparty is transmitted to the other nodes of the communication network.

To further limit the data received and processed by each of the relevant regional node computers, (ie, the distribution nodes closest to the particular site and/or closest to the particular counterparty), only changes in the credit state between a particular access node and a particular counterparty (ie, credit is no longer available or credit is now available) are transmitted to the distribution nodes, and any credit state information only relevant to transactions between two client sites both associated with other distribution nodes, may be altogether ignored.

In a preferred embodiment of the system as currently contemplated, if either of the two applicable limits has not already been exceeded between a particular pair of counterparties, the system displays the entire bid or offer as a "Dealable" transaction, but permits each client site to block any above-limit portion of any resultant buy or sell transaction during a subsequent deal execution/verification process. Alternatively, possibly at the option of the party by or for whom the low limit has been set, the entire transaction could be executed, or the entire transaction could be blocked. As a second alternative, the Preauthorization Matrix could indicate whether sufficient credit remained to execute a predetermined "standard" deal amount in addition to, or instead of, a mere indication as to whether any credit from a particular potential counterparty had already been used up. In such an alternate embodiment it might also be possible to display to each trader two "Dealable" prices: one at which at least the predetermined "standard" amount is available, and a second price at which only a "Small" amount may be available.

As currently contemplated, each of the regional nodes transmits both a Best current price (for which a predetermined minimum quantity is available independent of any credit constraints) and a best Dealable price (for which at least limited credit is presumably available on a bilateral basis with at least one of the counterparties making the bid or offer), as well as a "Small" indicator that may indicate a thin potential market in which that predetermined minimum quantity is not available at any price from any counterparty with whom the trader is eligible to deal, but nevertheless a smaller quantity is available from one or more of such eligible counterparties. In determining whether such a predetermined minimum quantity is available, the system may consider composite deals from more than one Maker or at more than one price, in which case the displayed price is preferably the least advantageous price included in the best such composite deal. In an alternative embodiment, the system does not take into account such composite deals when displaying a price, but still identifies the oldest quote at the best price as a potential match, thereby giving the traders the benefit of any price advantages for smaller sizes.

In accordance with another aspect of the preferred embodiment, at least the first Maker having an open quote that is displayable as the Best Dealable Price (which may be the "Best Small Dealable Price" or "Best Regular Dealable Price" at any of the other Trading Floors is automatically alerted that his bid (offer) quotation is the Best Dealable Price available to at least one potential counterparty with whom mutual credit exists, and thus could be hit (taken) at any time. Similarly, at least if the quoter's bid (offer) quote is equal to the Best Dealable Price but is not the first in time at at least one Trading Floor and is thus subject to immediately being hit (taken) by a trader at that Trading Floor, he is preferably also alerted if his quote is "joined" i.e., equal to in price, but later in time) to such a "Best Dealable Price" from another Trading Floor.

Preferably, in accordance with another aspect of the invention, the system also determines whether a Quote has been "bettered"; that is to say, no longer qualifies as a Best Dealable Price (or joined to such a price) at at least one potential counterparty. In that case, at the trader's option, the system will automatically cancel such a bettered price.

In accordance with yet another aspect of the invention, the displayed Best Dealable Price (unless accompanied by the "Small" indicator) is valid for at least a predetermined minimum quantity (which, as noted previously, may be a composite of small sizes from more than one source, or which always reflects a regular size from only one source, depending on system design tradeoffs and/or the trader preferences) and only prices and not quantities are displayed. However, assuming that the Best Regular Dealable Price for a regular quantity is greater than the Best Small Dealable Price, each trader may optionally select which of the two such Best Dealable prices is displayed.

When a "buy" or "sell" is made for a quantity in excess of the cumulative applicable credit limits associated with the counterparties having open quotes equal to or better than the displayed price and thus the completed transaction is for a cumulative quantity smaller than desired by the trader, the trader preferably then has the option of "working the balance" (in which the system automatically generates a bid/offer for the difference).

In accordance with yet another aspect of the invention, changes in the Best Dealable Price and specifics of any subsequent transactions initiated by the trader are optionally vocalized electronically by the trader's terminal and provided to the trader in audible form, together with succinct details of any subsequent transactions. For example: Whenever there is a change in the Best Dealable "Buy" Price, the least significant digits of that price are electronically converted to text which in turn is converted to digital speech using conventional speech synthesis circuitry.

The above description refers to the processing and distribution of data as though they were instantaneous processes; it will be appreciated by those skilled in the art that some delay is inherent in the type of system described, and that as a consequence, the information available at a particular processing node does not always reflect the most current information available anywhere in the system. However, at least in a preferred embodiment, any such delays in the display of Best Dealable Price information may be kept within acceptable limits by transmitting only changes over the communication network, by using several processing nodes operating in parallel to compute the Best Dealable Price information for different Trading Floors and/or different currencies, and by providing dedicated communication links between each processing node and its associated Trading Floors.

BRIEF DESCRIPTION OF THE DRAWINGS

Other objects and features of the present invention will be apparent from the following description of a presently preferred embodiment taken in connection with the accompanying drawings, in which:

FIG. 4 depicts the Trader Profile Display;

FIG. 6 depicts a Preauthorization Matrix; and

FIG. 7 is a functional flowchart showing how the Dealable price is computed.

DETAILED DESCRIPTION OF THE PREFERRED EMBODIMENT

Figure 1:
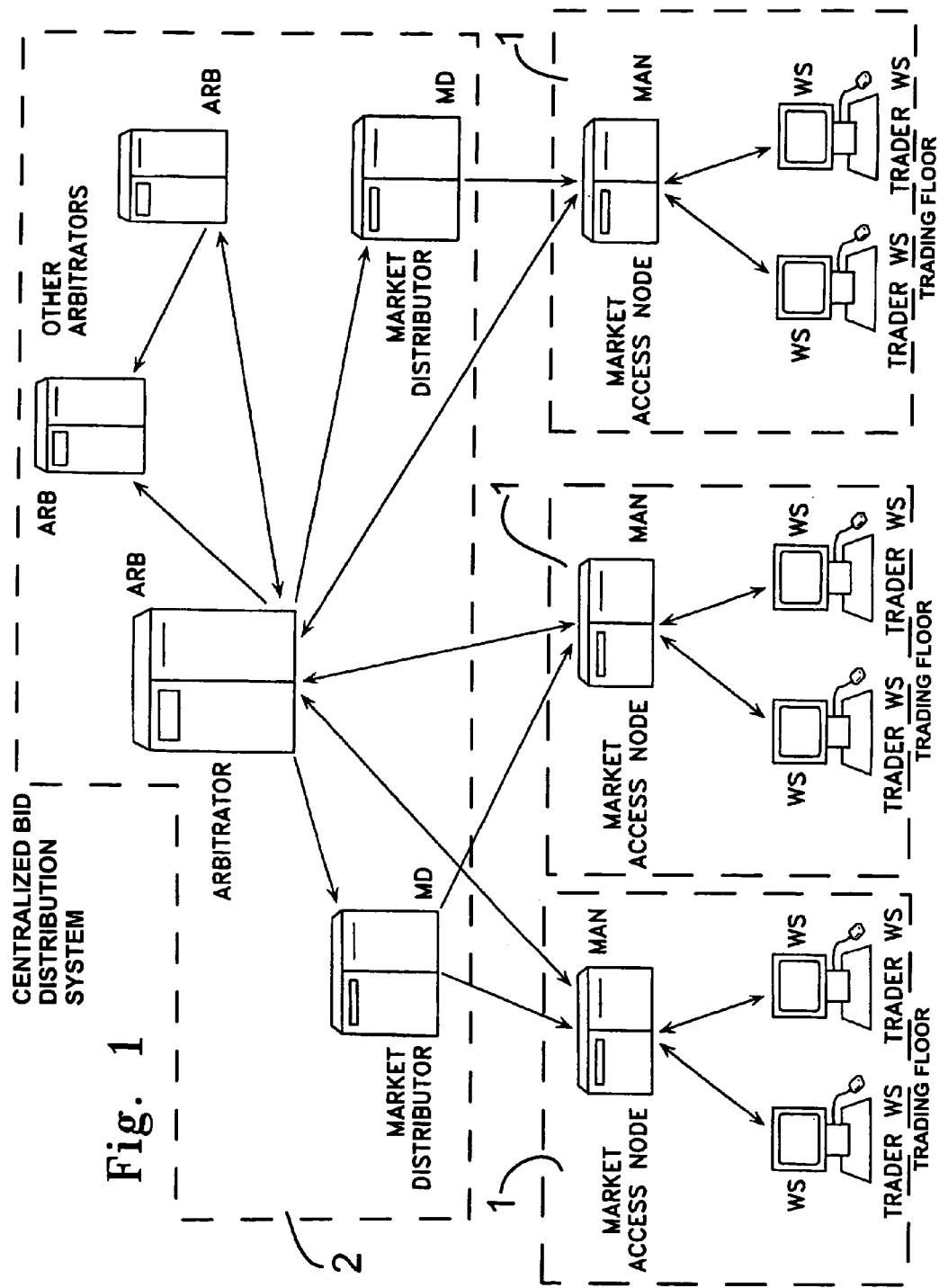
FIG. 1 is an overview of the Communication Network and the various workstations and processing nodes associated therewith.

In the described embodiment, the computerized trading system is an electronic brokerage system having a communication network for facilitating the buying and selling of large blocks of foreign currency by traders each associated with his own Workstation ("WS") located at a Trading Floor of a subscriber bank ("client site"). As shown in FIG. 1, each client site has its dedicated client site computer ("Market Access Node", or "MAN") under the control of a Floor Administrator, which maintains transaction records, credit limits, and other confidential information originating with its associated Trading Floor. The WS's and the MAN associated with each Trading Floor are connected via a conventional self-repairing DEC VAX network to a nearby distribution node ("Market Distributor" or "MD") computer, which typically analyzes and distributes current market data by means of dedicated permanent communication links to one or more associated MAN's in a particular city (or other local region), and which may also provide administrative functions for the communication network. Although not considered critical to the present invention, a group of MD's is preferably supplemented by a common Trading Region processing node ("Arbitrator Node" or "ARB"), with the ARB performing those functions (such as identifying potential matches between Buyers and Sellers, and other aspects of the "Dealing Matching" process that require coordination with more than one client site) which make the most efficient use of the communication network if done centrally or regionally, while the MD's perform those functions (such as generation of separate Dealable price information for each individual client site) which are readily implemented in parallel in a distributed processing network and which make most efficient use of the communication if done locally or in close proximity to the individual client sites.

In that regard, it is preferable to have more than one ARB, with each ARB having primary responsibility for trades initiated by Market Makers in the ARB's own Trading Region, and being connected to all the MAN's and MD's of that Trading Region as well as to the other ARB's in other Trading Regions by permanent dedicated links of the communication network. In the majority of deals, it is anticipated that both the Maker and the Taker will be within the same Trading Region and thus will be directly linked to the same ARB which can therefore identify a potential match and coordinate its final execution without any communication with the other ARB's; at the same time, the other ARB's can simultaneously be processing deals related to other traders in other regions. Connecting the various ARB's with one another by dedicated permanent communication links not only facilitates deals with a Taker in a remote Trading Region who does not normally have any direct link to the Maker's ARB, but also provides an efficient communication network for broadcasting price quotes to all the traders in other Trading Regions. Preferably, the various MD's, MAN's and ARB's are each provided with a local backup already connected to the communication network in accordance with the teachings of the commonly assigned U.S. patent application entitled "ACTIVATION OF A DORMANT SIBLING COMPUTER IN A COMMUNICATION NETWORK" and filed 9 Nov. 1990 under Ser. No. 07/612,045; however, it is also possible, albeit wasteful of communication resources, to establish temporary communication links between the MAN's and MD's of one trading area and an ARB in a remote trading area, so that the remote ARB can function as an emergency backup for the local ARB. In any event, the system is preferably provided with a self-test and re-initialization capability to detect discrepancies between the local data bases maintained at each of the local (MD) and regional (ARB) processing nodes, and to regenerate missing or questionable data from corresponding data stored at other nodes.

Whether the communication links between nodes are permanent (maintained indefinitely between two network components) or temporary (established dynamically for a short period of time) they are preferably "logical links" which have the property that messages sent in a certain order over the same logical link are guaranteed to reach their destination in the same order. Moreover, the communication network is preferably provided with sufficient error detection, error correction, and network self-repair capability to guarantee that messages sent via these logical links are error free.

In summary, each MAN is connected to other MAN's by a robust communication network which connects the various Trading Floors and which supplements the MAN's with a number of processing nodes (preferably in the form of MD's and ARB's) to facilitate the distribution of price quotations and other market data and to execute transactions by matching eligible Market Makers with eligible Buyers and Sellers and by monitoring the transactions until they have been completed or aborted, with the MAN's being responsible for Trading Floor specific tasks such as logging the completed transaction and updating the credit limit that was previously available to the counterparty Trading Floor.

The structure and function of the trader WS's, MAN's, MD's, and ARB's will now be described in detail, with particular emphasis on how they cooperate to distribute price quotes (bids and offers) from a Market Maker to potential Takers throughout the system. In the prior art, such quotes were made available to the individual traders merely in the form of one or more public best prices for each currency pair (or other financial instrument type) then being offered by any Market Maker, without regard for any confidential credit restrictions imposed by the Maker or by the potential Taker that may prevent any deal being consummated. However, in accordance with the present invention, each trader receives a private Dealable price, which the system has prescreened for the absence of any credit restrictions that would prevent the trader on whose WS the Dealable price is displayed from dealing with an anonymous Market Maker from whom the displayed price originates.

Figure 2:
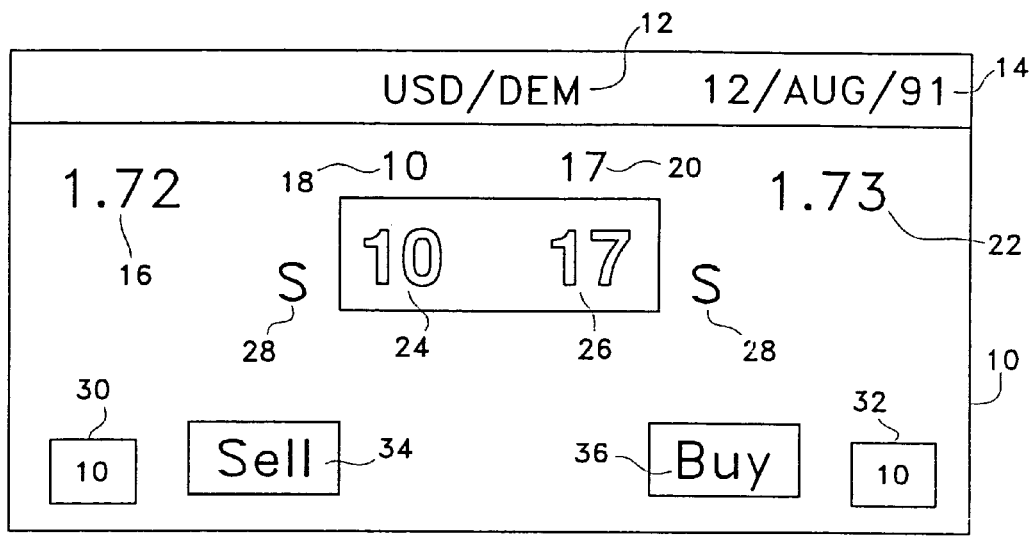
FIG. 2 depicts the trader's Buy/Sell display.
Figure 3:
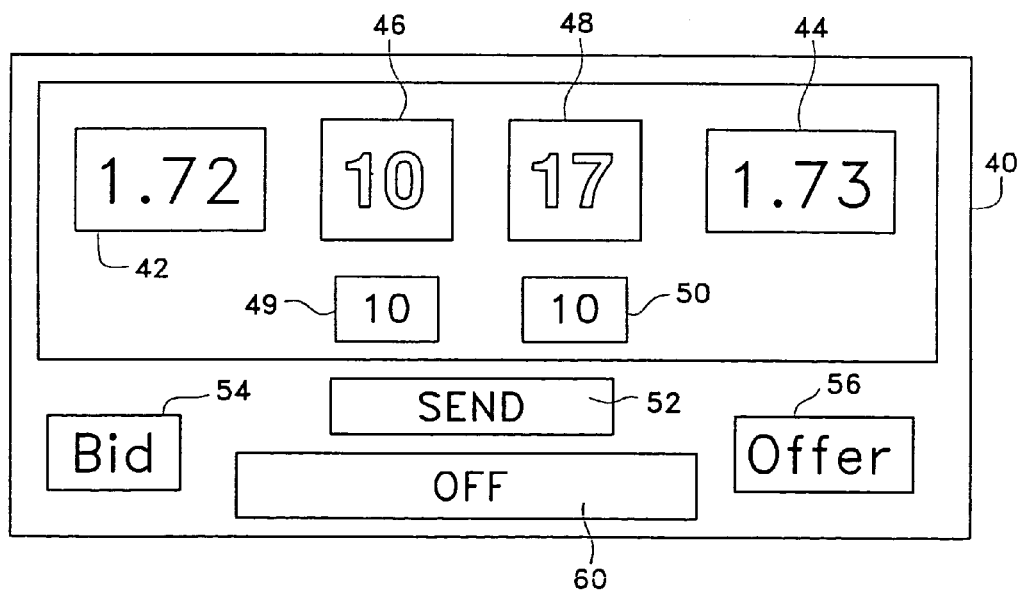
FIG. 3 depicts the trader's Quote display.

As shown in FIGS. 2 through 4, each WS supports a single trader trading in a single currency pair, and its display thus provides one or two panels containing only information which a typical trader would consider essential to trading in that currency pair by means of an anonymous brokerage system. However, the blank portion of the WS display could obviously be used for other data related to another currency pair and/or another type of transaction. Furthermore, the displayed panel could be a window within a larger display that also displays data from other information distribution and transaction processing systems.

FIG. 2 shows the trader's Buy/Sell display panel 10 which provides the primary interface between the electronic brokerage system and the individual traders. At the top of the display appears the currency pair 12 (as shown, the Base Currency is United States dollars, Local Currency is German marks), and at the top right, the "Value Date" 14 (the date on which any resultant trade is scheduled for payment). The next line comprises (from left to right): the "Figure" (the most significant three or four digits) 16 of the "Sell" ("bid") price, conventionally expressed in units of Local Currency (eg, DM 1.72) per single unit of Base Currency (eg, US$1.00); two additional digits 18, 20 (commonly referred to as "Pips") which respectively reflect the remaining two or three least significant digits of the displayed "Best Dealable" bid and offer Price (ie, the best price at which at least one anonymous Market Maker is willing to buy the Local Currency, and the best price at which at least one anonymous Market Maker is willing to sell the Local Currency); and the "Figure" 22 of the "Best" offer price.

A Market Maker will always want to purchase a commodity at a lower price than the price at which he is willing to sell the same commodity and his bid price will thus be less than his offer price. Moreover, the trading system is preferably able to "automatch" a bid price from one Maker with an equal or lower offer price from another Maker, assuming that the two Makers have sufficient credit with each other. Accordingly, the displayed "Best price" 18, 20 will normally reflect a price spread in which the offer price is equal to or higher than the bid price; however at times it may reflect an "Arbitrage Opportunity" in which a third party having credit with the two Makers is able to buy at a lower offer price from one Maker and sell at a higher bid price to the other Maker.

Furthermore, there is no requirement that a Market Maker must always quote both a bid price and an offer price for the same quantity of the Local Currency, or that if a bid (or offer) price is accepted by a Seller (or Buyer), any corresponding offer (or bid) price from that Maker will be (preferably at the trader's option) automatically withdrawn. Thus it is also possible that an offer price but no bid price (or vice versa) will be displayed as the Best price 18, 20 at the top of the display.

As presently contemplated, the displayed Best bid and offer prices 18, 20 are each valid for at least a predetermined quantity of currency (for example five million US dollars) from a single source. Since such a quantity may be available at the displayed price in a composite transaction involving more than one Maker and more than one price, it is possible that at least a portion of the transaction could be executed at a better price than the displayed Best price 18, 20.

In accordance with the invention, the Best Dealable Prices are derived only from those bids or offers from other Trading Floors which have been prescreened for at least some nominal level of remaining credit from the potential Maker to the potential Taker and vice versa, and at least the "Pips" 24, 26 portion of the Dealable is prominently displayed or otherwise communicated to the potential Taker.

In the illustrated example, the associated Taker (and any other USD/DEM traders on his Trading Floor) is thus eligible to sell German marks ("DEM") at the bid rate of 1.7210 marks per dollar ("USD"), or to buy at the offer rate of 1.7217 marks per dollar, and the system has already verified that the displayed Best Dealable Price 24, 26 is currently available from one or more anonymous Makers with whom the trader is currently still eligible to deal, and that those eligible Makers are willing (either collectively or individually, depending on the trader preferences and/or design tradeoffs mentioned previously) to sell (or buy) at least the same predetermined minimum quantity of the particular Local Currency involved as was used to determine the displayed Best Dealable Price 18, 20. Thus, a "regular" displayed Dealable Price 24, 26 will never be better than the displayed Best Market Price 18, 20; if worse than the Best Dealable Price 18, 20, this is an indication that the trader is barred by credit limitations from obtaining the Best Market Price that is then theoretically available. Indeed, because credit is established bilaterally, it is possible that the Maker (or Makers) behind the Best Market Price have extended credit only to Trading Floors who currently have not extended any credit to those particular Makers, and thus that none of the traders at any of the client sites will see a Best Dealable Price equal to the displayed Best Market Price.

The foregoing implicitly assumes that the Best Market Price 18, 20 and the Best Dealable Price 24, 26 are sufficiently close that the Figures 16, 22 are unaffected. If that is not the case, it is preferable that the displayed Figures correspond to the corresponding most significant digits of the displayed Best Dealable Price; if the "Pips" of the Best Market Price are worse than the corresponding least significant digits of a displayed Best Dealable Price, it will be apparent that the corresponding Figure of the Best Dealable Price should be incremented or decremented by at least one digit to obtain the Best Market Price.

Moreover, as with the Best Market Price, it is possible that at least a small quantity is available from one or more Makers at a better price than that which is currently displayed as a regular Best Dealable Price (or even that a better Best Dealable Price becomes available after the price is displayed but before the Taker's Buy or Sell request is processed), in which case the trader may receive or pay an effective average price that is somewhat better than the currently displayed Best Dealable Price. This will be the case whether the system has executed a single transaction only with a second Maker with whom the better price originated, or a composite transaction with that second Maker and the Maker with whom the displayed Best Dealable Price originated.

Instead of a regular Best Dealable Price (a "Best Regular Dealable Price"), a Best Small Dealable Price may be displayed preferably identified as such (for example, by the letter "S") 28. The Best Small Dealable Price differs from the Best Regular Dealable Price in that only a relatively small quantity is collectively available at any price from those Makers with whom the trader currently is eligible to deal. For example, if deal size is expressed in units of one million dollars, the Best Market Price and the Best Regular Dealable Price may each represent available deals having a potential aggregate value (not necessarily all from the same trader) of at least 5 million dollars, while a Best Dealable Small Price represents available deals having a maximum potential value of between 1 and 4 million dollars. The Best Regular Dealable price and Best Small Dealable Price are referred to generically as the Best Dealable Price.

Among the options available to each trader through his Trader Profile panel (see FIG. 4) is the ability to display either the Best Regular Dealable Price as described above, which is good for at least the previously mentioned predetermined minimum quantity (eg., at least 5 million dollars), or the Best Small Dealable Price which is the best price available to that trader for even a nominal minimum quantity (eg, only 1 million dollars).

Preferably, the trader has also previously specified a default transaction quantity using his Trader Profile Screen and the displayed Dealable price functions as the default value for the trader's requested transaction price. Thus, the trader may quickly and accurately respond to a new Dealable bid or offer price by merely activating a Buy button 36 or a Sell button 34, respectively on the screen, assuming that the display is touch sensitive or is provided with a "mouse" or other pointing device; alternatively the trader may use a small custom keypad having dedicated function keys for the various functions and dedicated size keys for various predetermined deal sizes as well as conventional numerical, tab and cursor keys. If the desired quantity 30, 32 is not available at the displayed Dealable price, as well be discussed in more detail with respect to FIGS. 3 and 4, any missed quantity may be the subject of a subsequent "working the balance" bid or offer.

In any event, the system gives the trader accepting a Best Regular Dealable Price the benefit of any undisplayed Best Small Dealable Price from an eligible counterparty that is "behind" (ie, equal to or better than) the Best Regular Dealable Price. In that case, the Buy or Sell request would be executed as two trades, one at the undisplayed Small Dealable Price, and the other at the displayed Best Regular Dealable Price.

As noted previously, the trading is performed electronically, and when a bid price is equal to or greater than an offer price, the two will normally be automatically matched, with the system automatically allocating any price difference between the two trader's in accordance with previously agreed trading rules. Thus it is not likely that a displayed bid price 18, 24 will be greater than a displayed offer price 20, 26. However, if two traders are barred from dealing with each other because of credit limit restrictions but are both free to deal with a third trader, it is still possible that the third trader will be presented with an arbitrage opportunity.

When the Dealable price 24, 26 originates with the trader himself (or another trader on the same Floor), the trader is preferably alerted to that fact by displaying his price as the Dealable price, but in a visually distinctive manner and with the corresponding Buy or Sell function 36, 34 optionally inhibited. Thus, his Trading Floor may be prevented from in effect dealing with or against itself.

In accordance with another aspect of the invention, the displayed price data may optionally be "vocalized": whenever there is a change in the displayed prices, the numerical data is electronically converted to text which in turn is converted to digital speech using conventional speech synthesis circuitry. In that event, it is preferable that only the "Pips" of the Best Dealable Price quotes are announced (unless, due to a large spread, this would result in an ambiguous price), so that the trader will not be assaulted with nonessential information. Thus, the vocalized information will normally include only the least significant digits (Pips) of the displayed Best Dealable Price (bid and offer), as well as status changes for any recent quotes or hits initiated by the trader. An exemplary trading scenario and the resultant vocalized communications is presented in Table 1.

TABLE 1

| Trader Action | Broadcast | Maker only | Taker only |
|---|---|---|---|
| Dealable price has Bid and offer | 10–17 | | |
| Bid side only | 10 bid | | |
| Bid size small | 10–17 Small Bid | | |
| Offer side only | 17 Offered | | |
| Offer size small | 10–17 Small Offer | | |
| Bid and Offer Small | 10–17 in Small | | |
| Bid/Offer Pips = "00" | Figure | | |
| Bid = Offer | 10 Choice | | |
| No Bid/Offer available | Dollar/Mark please | | |
| Dealable Bid/Offer removed | Bid/Offer out | | |
| Bid and Offer removed | Off the Price | | |
| Price change for Bid and Offer (worse only) | Change | | |
| You enter a Quote | | Bid/Offer/Price Posted | |
| Your Quote is best | 10–17 | Your Bid/Offer/Price | |
| Your Quote is Bettered by another Trader | | 14 Bid/Offered inside you | |

| Trader Action | Broadcast | Maker only | Taker only |
|---|---|---|---|
| You cancel Quote | | Bid/Offer/Price canceled | |
| Your Quote Joined by another trader | | Bid/Offer/Price joined | |
| You Join a Quote from another trader | | You join the Bid/Offer/Price | |
| Your Quote is no longer Joined | | Your Bid/Offer/Price only | |
| Bid/Offer/Price you joined hit, but yours available | | Still watching your Bid/Offer/Price | |
| Your Bid is hit | 10 Given (Small) | 10 yours from Bank X | You Sell 10 to Bank Y |
| Your Offer is Taken | 17 Paid (Small) | You Sell 10 to Bank X | You Buy 10 from Bank Y |
| Your quote is partially dealt on | Working Your Balance of X | | |
| Maker's Quote not Hit for a period of time | | Still working your Bid/Offer/Price | |
| Taker's Attempt to hit a Bid or Offer failed (too slow) | | | Missed it |
| Taker's Buy/Sell missed | | | Working your Balance of X |

FIG. 3 shows how the display is transformed when the trader is not content to assume a passive role in which he merely reacts to deals solicited by other traders, but rather wishes to assume for himself the role of a Market Maker. In that case, a Maker's "Quote" panel 40 appears below the Taker's "Buy/Sell" panel 10 of FIG. 2, so that the trader may act both as a Maker and as a Taker, using a pointing device or a designated key of an alphanumeric keyboard to move between the two panels. The Figures 42, 44 and Pips 46, 48 have the same function as in the Taker's panel, and take their respective initial values from the current Best price. As in FIG. 2, the bid information is on the left, while the offer information is on the right. Immediately below the price information, the trader is presented with the relevant bid and offer quantities 48, 50, conventionally expressed in millions of US dollars. When the Maker's panel first appears, these quantities assume default values (10, 10) established by the trader's personal trading profile. The trader is able to change any "Pips" or "quantity" amount shown on the Maker's panel by means of a numerical keyboard, using the enter key to move from field to field. Alternately, changes in the numerical data could be entered by selecting the field with a mouse or other pointing device, with a single click indicating an upward increment of one Pip and a double click indicating a downward increment of one Pip. Once the trader has changed the displayed numerical information to his satisfaction, he may then send a double sided bid/offer quote message (QuoteSubmit, FIG. 5) either by activating Send button 52 with a mouse or a conventional tab key and enter key, or by using a dedicated Send key on the trader's keyboard (not shown). Optionally, the trader may also send a single-side bid or offer, using the Bid button 54 or Offer button 56 instead of the Send button 52. Once the quote has been transmitted, an optional timer (not shown) may provide a visible and/or audible indication that a predetermined exposure time has elapsed. In addition, the trader may specify in his Trader Profile panel (FIG. 4) an optional automatic quote interrupt, whereby the quote is withdrawn once a predetermined maximum exposure time has been reached. At any time, the trader may use the Off button 60 to withdraw his current quote, whereupon he may compose and send a new quote.

Preferably, as will be discussed in additional detail with respect to FIG. 7, at the same time the system uses the quote and any associated credit prescreening information to determine the dealable prices to be displayed at each potential counterparty, the system also determines whether the current quote is equal to the Dealable price (either Best Dealable or Regular Dealable) available to any potential counterparty with whom bilateral credit currently exists, and if so, alerts the quoter that the displayed price has priority in time over any other available quote for that deal size (regular or small) from other trading floors and is subject to immediately being hit/taken (a "Red Dealable" quote, preferably indicated by red background) or is equal to such a Red Dealable (regular or small) quote from another trading floor (a "Joined" quote, preferably indicated by a =sign and a yellow background).

As shown in FIG. 4, each trader can call up a "Trader Profile" screen 70 to select his current trading currency 72, and also to establish or modify his personal default values for normal and maximum trading size 74, 76 and price time limit 78, and his preferences regarding optional automated trading protocols 78, such as canceling a quoted price that has been partially dealt (only a portion of the available size was matched with a qualified counterparty) or bettered (is not equal to the Best Dealable price for that size that is currently available to any potential counterparty with whom bilateral credit still exists). As noted previously, the trader may also elect to display the Regular 80 or Best 82 Dealable price, and the system also provides the trader with various options 82 for automatically "working the balance" in the event the trader attempts to buy or sell a particular quantity at the displayed Dealable price but misses the deal in whole ("complete") or in part ("partial"). Depending upon the particular option selected, the system automatically generates and transmits a bid at the last Dealable offer price if the trader was not able to buy the full quantity desired, for a quantity equal to the difference between the desired quantity and the quantity actually traded.

In addition, a Floor Administrator (preferably for internal security reasons a bank employee free of any trading responsibilities) has his own WS with a Floor Profile screen (not shown) which includes an option to prevent his own traders from trading with each other, and a maximum Business Day Credit Limit for each eligible counterparty which represents the maximum cumulative value of trades that may be executed by all traders of the Trading Floor with the designated counterparty. Alternately, the system could combine transactions from related Trading Floors, in which case the Floor Profile could merely identify a common credit facility having a single credit limit for each Trading Floor or groups of Trading Floors. The Floor Administrator also selects a warning percentage which the system uses to broadcast a warning message to the Administrator and all the traders on a given Floor that a particular counterparty has utilized a specified percentage of its available credit, in which case the traders may wish to alter their trading strategies and/or the Floor Administrator may choose to raise the applicable credit limit.

Figure 5:
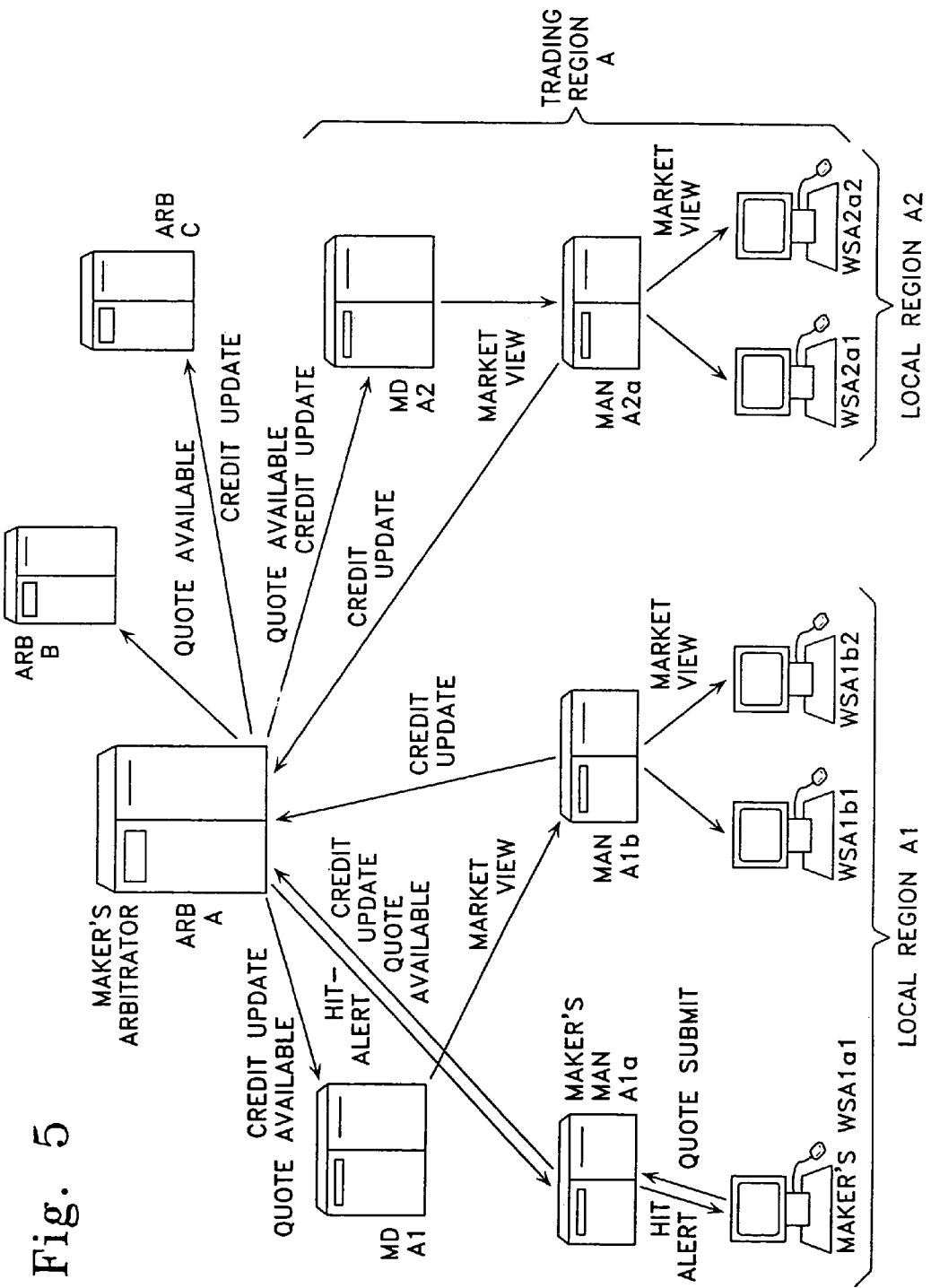
FIG. 5 shows the flow of messages in the communication network which are used to generate and distribute Dealable price information to each individual trader.

FIG. 5 shows the flow of electronic messages relating to the distribution of customized Dealable price information to each Trading Floor. The trader at WS A1a1 of Trading Floor A1a uses his Price Quotation (Market Maker) Panel (FIG. 3) to generate a QuoteSubmit message to the Trading Floor's MAN (MAN A1a) in the form of a bid to buy at 1.7215 and an offer to sell at 1.7216. The MAN in turn logs the QuoteSubmit as two open quotations (one, if a single-sided quote) and forwards the QuoteSubmit message to the Maker's Arbitrator Node (ARB A) whose assigned geographical Trading Region includes the Maker's Trading Floor A1a1. In turn, ARB A updates an ordered list of available bids and an ordered list of available offers for the relevant currency pair, each bid or offer being ranked by price and time of receipt (preferably at the Maker's ARB), and containing data fields for indicating the Quantity (preferably expressed in Base Currency units) of the Local Currency still available for purchase or sale, and the Quantity reserved by the Arbitrator pending completion or failure of a pending deal resulting from a potential match initiated by the arbitrator and not yet confirmed by the Maker and Taker. A corresponding QuoteAvailable message is then transmitted from the Maker's ARB A to the MD's in its Trading Region MD A1, MD A2, and to the other ARB's for eventual distribution to the MD's and MAN's of other Trading Regions.

Each MAN (for example, MAN A1b) also transmits a CreditUpdate message to its associated ARB (ARB A) whenever the credit status for any of its potential counterparties (for example, A1a or A2a) changes from CreditAvailable to CreditNotAvailable or vice versa, which the ARB then retransmits to its affected MD's and to the other affected ARB's.

The MD's then use the information in the received CreditUpdate messages to maintain a Preauthorization Matrix PM such as that shown in FIG. 6. The rows and columns of the matrix PM are associated with the various Trading Floors A1a, A1b, A2a, etc (including any Floors in other Trading Regions) and for each ordered pair of Trading Floors {$TF_i$,$TF_j$} contains an indication as to whether $TF_i$, has extended any credit to $TF_j$. In the depicted example, credit exists on a bilateral basis between TFA1 and TFA2, no credit exists between TFA1 and TFB1, and credit has been extended unilaterally from TFB1 TFA2, but not vice versa (as indicated by the "1" at the intersection of row TFB1 with column TFA2 and the "0" at the corresponding intersection of column TFB1 with row TFA2). From the main diagonal of the matrix it can be seen that only TFA2 permits its own traders to trade between themselves, as indicated by the "1" at the intersection of row TFA2 with column TFA2. Preferably, each MD only maintains a partial Preauthorization Matrix containing data only regarding credit extended from or to its associated MAN's to the other potential counterparties (MAN's) in the system. Thus, as indicated in FIG. 6 by cross hatching, some of the matrix entries may be blank.

The MD's use the QuoteAvailable messages to update their own ordered lists of available bids and offers; these ordered lists and the above-described Preauthorization Matrix are then used by the MD to calculate separate Dealable prices for each Trading Floor which are transmitted as MarketView messages to the affected MAN's, as will be described in more detail hereinafter with reference to FIG. 7. In addition, the MD's and/or ARB's use a similar procedure to identify which quotes from which Trading Floors are "Red Dealable" or "Joined" or "Bettered": A quote is "Red Dealable" only if it is the basis (best in price and time of the bids or offers originating from Trading Floors with which bilateral credit is still available) for a Best Dealable Price displayed at one or more Trading Floors; once the "Red Dealable" quotes have been identified, the other quotes may be readily categorized as either "Joined" (if not first in time) or "Bettered" (if not best in price).

The actual deal is executed using a known two-stage commitment logging process (not shown) in which DealVerify and DealVerifyOk messages are logged by and transmitted from the Maker's MAN to the Taker's MAN and vice versa, after each MAN has verified that the other party to the deal has been extended sufficient credit by the Man's associated Trading Floor to cover the full deal quantity (otherwise the deal is aborted or is cut back in quantity). As an additional precaution, the Maker's MAN also checks that the quote has not been interrupted and that the WS from which the quote originated is still on-line, before any DealVerify or DealVerifyOk message is transmitted to the other Trading Floor (equivalently, each WS involved could perform its own logging and communicate directly with the other WS; however, this would complicate any subsequent automated deal recovery or rollback). A suitable logging, verification, and recovery/rollback process is disclosed in further detail in the commonly assigned U.S. Pat. No. 5,305,200 and entitled "FINANCIAL EXCHANGE SYSTEM HAVING AUTOMATED RECOVERY/ROLLBACK OF UNACKNOWLEDGED ORDERS". In any event, it should be understood that each ARB also maintains a log of potential matches which have not yet been verified or canceled by the affected MAN's, and that if these potential matches are not resolved within a predetermined time period, a similar automated rollback/recovery process can update the ARB's log on the basis of the logs maintained by the affected MAN's (for example, the match may be automatically canceled (rolled back) if either MAN does not have a corresponding entry in its respective log).

FIG. 7 sets forth a possible implementation of how the MD computes a Dealable bid for a particular currency currently available to a particular Trading Floor, which may then be transmitted in the form of a MarketView message to that Trading Floor. Preferably, in order to avoid the transmission of redundant information and consequent excessive loading of the communication network, these MarketView messages are transmitted to a particular MAN only in response to a change in the Best Dealable Price for the associated Trading Floor. Moreover, it may be more efficient to transmit information only for those active currency pairs which the Trading Floor's MAN has previously identified to its MD in an ActiveCurrencyPair message.

As indicated symbolically in FIG. 7 at block 100, the MD first selects the particular Trading Floor and Currency Pair for which the Dealable bid and offer price is to be computed (FIG. 7 shows only the computation of the Dealable bid price; a similar computation is then performed for the Dealable offer price before a new Trading Floor and/or Currency is selected). The MD then resets (block 102) the counters, registers and flags (i, P, Q, S) it will use in the computation of the Dealable price P.

What follows is a loop controlled by counter i, which points to the entries in the particular ordered Quote List associated with the Currency Pair and transaction type (bid or offer) then being processed, and which is incremented at the beginning of the loop (block 104). If the end of the Quote List has already been reached (Yes branch from decision block 106), the current values of the price P and the associated Small flag S are transmitted to the Trading Floor TF, together with an indication of the current Currency Pair CP (as previously noted, no such transmission is required if the price and Small flag for that Currency Pair to that Trading Floor are unchanged). However, if the end of the Quote List has not already been reached (No branch from decision block 106) the next quote is then read (block 110) and the relevant entries in the Preauthorization Matrix for the current Trading Floor (TF) and the Maker of the current quote (Mi) are then checked to determine if any previously extended credit has already been exhausted (decision blocks 112, 114). If either entry is "0" (indicating no credit available) control passes to the beginning of the loop (block 104), for processing of any remaining quotes in the applicable list.

However, if both relevant entries of the Preauthorization Matrix are "1" (indicating at least some credit is available on a bilateral basis between the current Trading Floor TF and the Maker $M_i$ from which the current quote $Q_i$ originated), the price Pi associated with quote $Q_i$ is loaded into the price register P, and the associated Available Quantity $Q_i$ is added to the contents of the Quantity register Q (block 116), which is then tested (decision block 118) to determine if at least a predetermined minimum quantity (eg, 5) is available to the current Trading Floor TF; otherwise control passes to the beginning of the loop (lock 102) and the process is repeated.

Assuming that the predetermined minimum quantity is available (Yes branch from block 118), the Small flag is reset to 0 in block 120, and control passes to block 108, whereby the Dealable price is transmitted and the process is repeated.

It will be understood that the above assumes that a Best Dealable Price may be based on a potential composite deal which is based only on quotes for a small size of the currency in question and that a Best Small Dealable Price is to be displayed only if such a regular dealable price is not available from any qualified counterparty or combination of qualified counterparties; if as mentioned previously it is desired to display only Best Regular Dealable Prices from a single source and/or to give each trader the option of displaying either the Best Small Dealable Price or the Best Regular Dealable Price, then it may be necessary to scan the available quotes twice (once for the best available regular sized quote, once for the best available quote regardless of size) and/or to maintain separate registers for Best Regular Dealable Prices and the Best Small Delable Prices.

By using more than one MD each in the form of a dedicated computer, the computation of Best Dealable Prices is distributed among several computers and is free from interruption by other unrelated tasks. Moreover, only a minimum amount of essential information is transmitted to the MD from its ARB, and from the MD to its MAN's. Thus even in a fast moving market, it should be possible to provide current Dealable price information to each Trading Floor. However, if an MD is responsible for distributing Dealable prices to more than two Trading Floors, it may be preferable to use a conventional pseudorandom generator to select the next Trading Floor, thus avoiding any bias inherent in the sequence in which the Dealable price information is computed and distributed.

As mentioned previously, the MD could, at the same time it reviews the ordered list of available quotes, also identify any quote which qualifies as "Red Dealable" or "Joined" and transmit a corresponding HitAlert message to the Maker's MAN (possibly via the Taker's ARB and the Maker's ARB). Alternatively, each ARB could repeat the process of FIG. 7 for each Trading Floor in the entire trading system, which would require more computational resources but fewer communication resources. In particular, such an alternate embodiment, as shown in FIG. 5, would require at most only one HitAlert message for each bid or offer (to the Maker's MAN from the Maker's own ARB).

We claim:

1. A computerized trading system for enabling a plurality of traders to trade with one another, the trading system comprising:
   a central computer system including at least one computer, the central computer system receiving quotes;
   a plurality of trader terminals, each of the trader terminals being associated with a respective trader, at least some of the traders sending one or more of the quotes to the central computer system via their respective trader terminals;
   the central computer system forwarding best dealable quote information to each trader terminal of at least a subset of the trader terminals indicating which of the quotes received by the central computer system is the best quote which can be accepted by the trader using the respective trader terminal as a function of credit information related to such trader; and
   each trader terminal of the subset displaying the best dealable quote which the trader associated with that trader terminal can accept as a function of the best dealable quote information sent to it whereby such best dealable quote has been prescreened for credit.

2. The computerized trading system of claim 1, wherein the central computer system is a distributed system of computers.

3. The computerized trading system of claim 2, wherein at least some of the computers are located at locations remote from one another.

4. The computerized trading system of claim 1, wherein the subset of trader terminals includes at least three trader terminals.

5. The computerized trading system of claim 1, wherein the subset of trader terminals is all of the trader terminals.

6. The computerized trading system of claim 1, wherein:
   a plurality of businesses use the computerized trading system;
   each of the trader terminals is associated with an associated one of the businesses; and
   the central computer system receives a respective portion of the credit information from each of the businesses.

7. The computerized trading system of claim 6, wherein the portion of the credit information received from each of the respective businesses indicates credit information about at least one of the other businesses.

8. The computerized trading system of claim 1, wherein the quotes are for a product.

9. The computerized trading system of claim 8, wherein the product is a financial instrument.

10. The computerized trading system of claim 9, wherein the financial instrument is a currency pair.

11. The computerized trading system of any one of claims 1 through 10, wherein the credit information is bilateral credit information related to respective pairs of traders.

12. The computerized trading system of claim 1, wherein, for each respective trader using the subset of trader terminals, the credit information related to the respective trader includes information indicating whether entities associated with other traders have granted credit to the respective trader.

13. The computerized trading system of claim 12, wherein the entities associated with other traders grant credit to the respective trader by granting credit to an entity with whom the respective trader is associated.

14. The computerized trading system of claim 1, wherein the central computer system also forwards best market quote information to each trader terminal of the subset of trader terminals providing information about best quotes entered into the trading system whether such quotes can be accepted by the trader using that trader terminal based upon credit information related to such trader or not.

15. The computerized trading system of claim 14, wherein the best market quote information is indicative of the best quote entered into the trading system irrespective of whether or not the trader using that trader terminal can accept such quote based upon credit information related to such trader.

16. The computerized trading system of claim 15, wherein each trader terminal of the subset also displays information about the best quote entered into the trading system, whether such quote can be accepted by the trader using that trader terminal or not, based upon the best market quote information forwarded to it.

17. The computerized trading system of claim 14, wherein each trader terminal of the subset also displays information about quotes entered into the trading system that cannot be accepted by the trader using that trader terminal based upon the best market quote information forwarded to it.

18. The computerized trading system of claim 1, wherein the credit information is information related to the amount of credit entities associated with other traders extend to the trader using the trader terminal in question.

19. A computerized method of providing information to a plurality of traders using respective trader terminals, the information relating to quotes which can be accepted by the traders, the method comprising:
   sending quotes to a central computer system comprising at least one computer;
   determining at the central computer system which quotes can be accepted by each trader as a function of credit information related to that trader;

forwarding information to each respective trader terminal the information being based upon the determination and indicating the best quote that can be accepted by the trader using that trader terminal; and displaying at each respective trader terminal the best quote the trader using that trader terminal can accept.

20. The method of claim 19, wherein the best quotes that can be accepted by the trader using the respective trader terminal are displayed at designated locations of a display associated with the respective trader terminal.

21. The method of claim 20, wherein the designated locations include a best quote location and a best offer location and wherein the best quote, if any, and best offer, if any, which can be accepted by the trader using the respective trader terminal are displayed in the best quote and offer locations of that trader terminal, respectively.

22. The method of claim 21, wherein no other quotes are displayed in the best quote and best offer locations, respectively.

23. The method of any of claims 19 through 22 and 24, wherein the credit information is bilateral credit information between respective pairs of counter-parties.

24. The method of claim 20, wherein the designated locations are visually distinct locations of the display.

25. A method of trading on a computerized trading system, the method comprising:
entering a quote into the computerized trading system on behalf of a first trading entity;
the computerized trading system determining whether the quote should be offered to a second trading entity as a function of the amount of credit the first trading entity has extended to the second trading entity;
the computerized trading system offering the quote to the second trading entity if the determination is positive and not offering the quote to the second trading entity if it is negative;
the second trading entity indicating that entity's desire to accept the quote; and thereafter
the computerized trading system rechecking the amount of remaining credit the first trading entity is extending to the second trading entity and determining whether all or a portion of the quote can be accepted as a function of the amount of remaining credit.

26. A method for permitting a plurality of market makers to trade anonymously with a plurality of market takers over a computerized trading system, at least some of the market takers using respective taker terminals to trade with one or more of the market makers, the method comprising:
entering quotes from the market makers into the computerized trading system;
entering credit information into the computerized trading system, the credit information being related to the amount of credit at least entities associated with the market makers extend to at least some entities associated with the market takers; and
determining, for each of a plurality of taker terminals, a best quote which can be accepted by the respective market taker using the respective taker terminal as a function of at least both:
(a) the quotes entered into the computerized trading system; and
(b) at least a portion of the credit information entered into the computerized trading system and related to the respective market taker using the respective taker terminal; and
displaying the respective best quote at the respective taker terminals.

27. The method of claim 26, wherein a plurality of the market takers are associated with a single trading floor and wherein part of the entered credit information is indicative of the amount of credit extended to the single trading floor and is therefore related to the amount of credit extended to the market takers associated with the single trading floor.

28. The method of claim 26, wherein each taker terminal displays a respective best quote which can be accepted by the market taker using that taker terminal as a function of both the quotes entered into the computerized trading system and at least a portion of the credit information entered into the computerized trading system.

29. The method of claim 26, wherein at least some of the market makers use respective maker terminals to trade with one or more of the market takers and wherein the market makers enter their quotes into the computerized trading system via their respective maker terminals.

30. The method of claim 26, wherein the credit information is entered into the computerized trading system via administrator terminals.

31. The method of claim 26, wherein:
the entered credit information is also related to the amount of credit at least some of the market takers extend to at least some of the market makers; and
the best quote displayed at the plurality of taker terminals is determined as a function of a portion of the credit information entered into the computerized trading system and related to at least some of the market makers.

32. The method of claim 31, wherein the best quote displayed at each respective taker terminal is determined as a function of bilateral credit between the market taker using the respective taker terminal and the market maker who entered the quote into the computerized trading system.

33. A method of trading on a computerized trading system, the method comprising:
entering a quote into the computerized trading system on behalf of a first trading entity;
the computerized trading system determining whether the quote should be offered to a second trading entity as a function of at least the amount of remaining credit a first credit granting entity, which is associated with the first trading entity, has extended to a second credit granting entity, which is associated with the second trading entity; and thereafter
the computerized trading system offering the quote to the second trading entity if the determination is positive and not offering the quote to the second trading entity if the determination is negative, whereby the quote has been prescreened for credit.

34. The method of claim 33, wherein the computerized trading system determines whether the quote should be offered to the second trading entity also as a function of the amount of remaining credit the second credit granting entity has extended to the first credit granting entity, whereby the quote has been prescreened for bilateral credit.

35. The method of claim 34, wherein the second trading entity informs the electronic trading system that it wants to accept the quote after it has been offered to the second trading entity.

36. The method of any one of claims 33 and 34, wherein the first and second trading entities are first and second trading floors, respectively, each trading floor having a plurality of traders who trade on the computerized trading system on behalf of their respective trading floors.

37. The method of claim 36, wherein the trading floors are owned by respective businesses.

38. The method of claim 36, wherein the first and second credit granting entities are the first and second trading floors, respectively.

39. The method of claim 36, wherein the quote is entered into the trading system by a trader of the first trading floor.

40. The method of claim 33, wherein the trading entities are the credit granting entities.

41. The method of claim 33, wherein the second trading entity informs the electronic trading system that it wants to accept the quote after it has been offered to the second trading entity.

42. The method of claim 41, wherein, after the second trading entity has indicated its desire to accept the quote, the computerized trading system rechecks the amount of remaining credit the first credit granting entity has extended to a second credit granting entity to determine if there is sufficient remaining credit for the trade to be made.

43. The method of claim 42, wherein, after the second trading entity has indicated its desire to accept the quote, the computerized trading system rechecks the amount of remaining credit the first credit granting entity has extended to a second credit granting entity and the amount of remaining credit the second credit granting entity has extended to the first credit granting entity, to determine if there is sufficient remaining bilateral credit for the trade to be made.

44. The method of any one of claims 33 and 34, wherein the computerized trading system comprises a central computer system including at least one computer and a plurality of trader terminals.

45. The method of claim 44, wherein the computer offers the quote to the second trading entity via one or more trader terminals associated with the second entity.

* * * * *